R. W. KELLY.
SLACK ADJUSTER.
APPLICATION FILED FEB. 13, 1909.
949,680.
Patented Feb. 15, 1910.
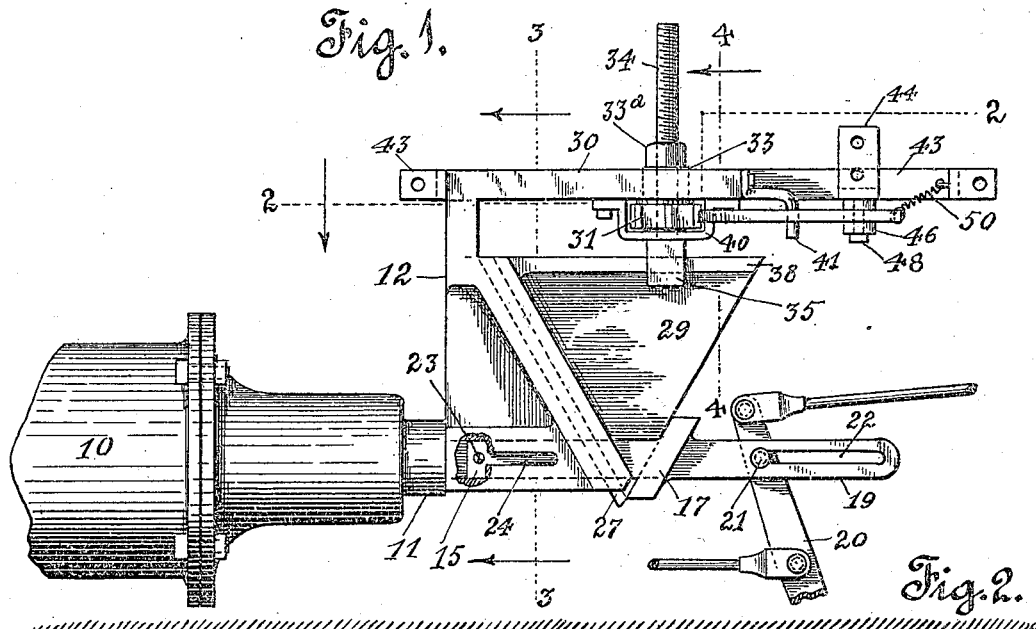
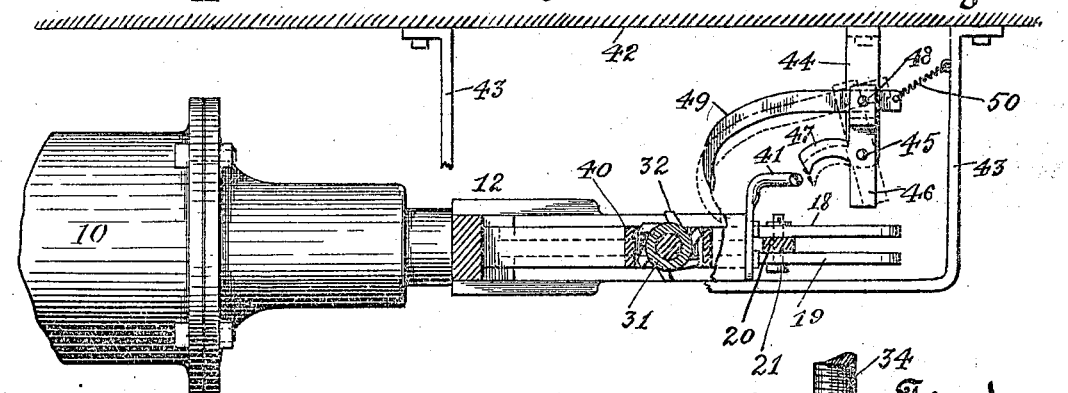
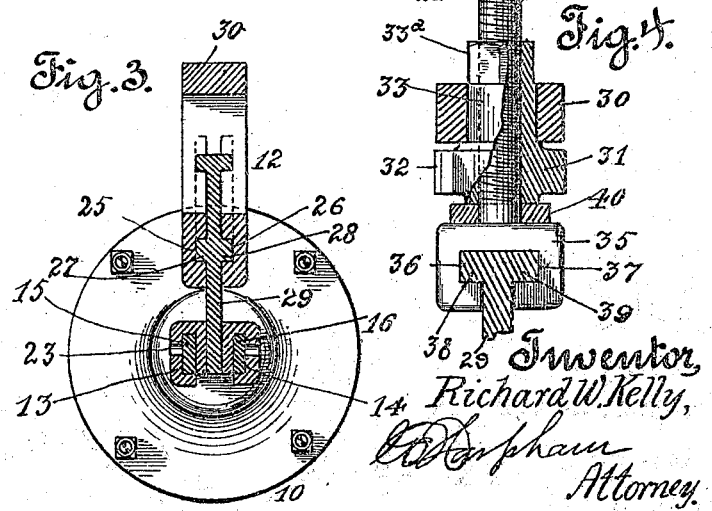
Witnesses.
Inventor,
Richard W. Kelly,
Attorney

UNITED STATES PATENT OFFICE.

RICHARD W. KELLY, OF LOS ANGELES, CALIFORNIA, ASSIGNOR OF ONE-HALF TO G. E. HARPHAM, OF LOS ANGELES, CALIFORNIA.

SLACK-ADJUSTER.

949,680.                Specification of Letters Patent.     Patented Feb. 15, 1910.

Application filed February 13, 1909. Serial No. 477,527.

*To all whom it may concern:*

Be it known that I, RICHARD W. KELLY, a citizen of the United States, residing in the city of Los Angeles, county of Los Angeles, and State of California, have invented new and useful Improvements in Slack-Adjusters, of which the following is a specification.

My invention relates to a slack adjuster for use in an automatic air brake mechanism and the object thereof is to provide a slack adjuster which will automatically take up the slack caused by lost motion or wear of the brake shoes. I accomplish this object by the mechanism described herein and illustrated in the accompanying drawings in which;

Figure 1 is a plan of my improved slack adjuster, and certain portions of the connecting mechanism. Fig. 2 is a section taken on the line 2—2 of Fig. 1. Fig. 3 is a section taken on the line 3—3 of Fig. 1. Fig. 4 is an enlarged section on the line 4—4 of Fig. 1 with a portion of the parts broken away for clearness of illustration.

My slack adjuster is primarily designed for freight car service, and will be described herein as applied to that service.

In the drawings 10 is a fragment of a brake cylinder of any standard construction. 11 is the push bar sleeve to which is rigidly secured the slack adjuster frame 12. This slack adjuster frame is provided along its inner edge with two push bar channels 13 and 14 best shown in Fig. 3, into which are received the inner ends 15 and 16 of the push bar head 17. The outer ends 18 and 19 of the push bar straddle lever 20 of the brake mechanism and are secured thereto by the bolt 21 which passes through slot 22 in the outer ends of the push bar and through lever 20. One of the inner ends of the push bar, preferably 15, is provided with a pin 23 which passes upwardly through a slot 24 in the slack adjuster frame to prevent the push bar from accidentally separating from the slack adjuster frame after the parts are assembled for use. After the inner ends of the push bar are passed into the push bar channels, pin 23 is passed through the slot and secured in the end of the push bar in any suitable manner.

In the outer end of the slack adjuster frame which, as shown in Fig. 1, lies at an angle to the push bar channels, are the adjusting wedge channels 25 and 26 in which are received the edge lugs 27 and 28 of the adjuster wedge 29. These lugs and channels guide the movement of the wedge and at the same time hold the wedge from separating from the frame.

To the outer edge of frame 12 is secured an L-shaped screw carrying arm 30 which is preferably cast integral with frame 12. Revolubly mounted in this arm is a ratchet wheel 31 having teeth 32. The hub 33 of this ratchet wheel is hollow and internally threaded for the reception of the threaded shank 34 of the wedge operating bar which has a head 35 that is bifurcated and provided with channels 36 and 37 as best shown in Fig. 4, into which channels are received the end lugs 38 and 39 of the adjuster wedge. Between arm 30 and wedge 29 shank 34 passes through a retaining and brace frame 40 which is secured to arm 30. This retaining frame prevents any longitudinal movement of the ratchet wheel. The hub of the ratchet wheel projects through arm 30 and has the outer end 33$^a$ squared for the reception of a wrench so that when desired the ratchet wheel may be rotated, thereby moving the wedge in or out as desired. To the outer end of bar 30 is secured the dog operating arm 41.

To the wall 42 of the bottom of the car is secured a supporting frame 43 which passes just below arm 30 so as to guide and support the same. A bracket 44 is also secured to the car and projects downwardly therefrom. Pivotally secured to bracket 44 by bolt 45 is lever 46 having a curved arm 47 secured thereto on the side of said lever adjacent to arm 41. The upper end of lever 46 is preferably forked and in the furcations is pivotally mounted by bolt 48, dog 49, the rear end of which projects through the furcations and has secured thereto a spring 50. The other end of the spring is secured to frame 43.

In the operation of my device the parts will be adjusted so as to normally be in the position shown in Fig. 1 and the travel of the brake piston will be such that when the brakes are set the travel of arm 41 outwardly will just reach to but not engage lever 46. When there is any slack in the braking apparatus caused by lost motion, or from the wear of the brake shoes, the brake piston will travel outwardly a greater distance than the normal travel, thereby causing arm 41 to engage the lower end of lever 46 which will throw the upper end of the lever toward the brake cylinder and carry dog 49 to the position shown in dotted lines in Fig. 2, and will throw arm 47 of lever 46 downwardly to the position shown in dotted lines so that it will be engaged by arm 41 upon the backward travel of the piston. As the piston travels backwardly, dog 49 will engage teeth 32 of the ratchet wheel and when arm 41 engages the arm on lever 46 it will draw lever 46 to its vertical position, thereby causing dog 49 to rotate the ratchet wheel. The rotation of the ratchet wheel will cause operating bar 35 to move toward the push rod thereby causing wedge 29 to move farther through the inner ends of the push rod, and thereby maintain the normal piston travel until more slack is caused. Each reciprocation of the brake piston will take up slack if the dog 49 is caused to move far enough to engage the teeth of the ratchet wheel. When wedge 29 has been moved its full width it will then be necessary to have new brake shoes put on and the other mechanism readjusted to the normal position when the wedge will be brought back to its normal position as shown in Fig. 1.

By this construction it will be observed that a cheap and efficient means is provided for taking up the slack of a braking mechanism, and that the slack is taken up automatically by mechanism operated by the piston travel of the brake cylinder. It will also be observed that the movement of the wedge is effected by the backward travel of the piston in the brake cylinder when there is no pressure on the parts. Ordinarily dog 49 would only engage one tooth of the ratchet wheel, but if there should be excessive slack, the dog would be moved far enough to engage two teeth of the ratchet wheel, thereby more quickly taking up the slack. It will also be observed that frame 12 and bar 17 conjointly form a push rod formed of telescopic parts, and that wedge 29 operates to elongate the push rod as it is forced between the telescopic parts on the rearward movement of the brake cylinder piston.

Having described my invention what I claim is:

1. A slack adjuster comprising a push rod formed of telescopic parts, one of said parts being secured to the brake cylinder piston and the other part being operatively connected to the brake levers; expansible means carried between said telescopic parts; and means to operate said expansible means to cause the outer ends of said telescopic parts to become further separated upon the abnormal travel of the brake cylinder piston.

2. In a slack adjuster the combination of a push rod sleeve; an adjuster frame rigidly secured thereto; a push rod telescopically contained in said frame; expansible means slidably mounted in and carried by said frame and bearing against said push rod; and means to operate said expansible means to cause the outer end of the push rod to remain at a greater distance from the frame upon an abnormal travel of the brake cylinder piston.

3. In a slack adjuster the combination of a push rod sleeve; an adjuster frame secured rigidly thereto; a push rod having one end telescopically movable in said frame and the other adapted to be connected to the brake lever, said ends of said push bar being bifurcated; a wedge adapted to be passed between the bifurcated ends of said push bar contained within the adjuster frame; and means to move said wedge between said arms upon the abnormal travel of the brake piston.

4. A slack adjuster comprising a push rod sleeve; an adjuster frame rigidly secured thereto; said frame being provided with push bar channels along its inner edge and having its outer end at an angle to the push bar channels and having wedge lug receiving channels in its outer end; a wedge having lugs on one edge thereof adapted to be received in the channels in the end of the adjuster frame; an L-shaped arm secured to said adjuster frame; a ratchet wheel revolubly mounted in said arm, said ratchet wheel having a hollow internally threaded hub; a wedge operating bar, externally screw threaded and passing through said ratchet wheel in threaded contact therewith, said bar having a head operatively and slidably connected to said wedge; a dog operating arm secured to the arm in which the ratchet wheel is mounted; a bracket secured upon the bottom of the car; a lever pivotally mounted on said bracket, having its lower end lying in the path of travel of the dog operating arm whenever said arm makes an abnormal travel; a curved arm secured to said lever and having the point thereof normally lying above the path of movement of the dog operating arm, and adapted to be moved behind said arm upon the abnormal travel thereof; and a dog mounted in the upper end of said lever, and adapted to be thrown in the path of travel in the ratchet wheel and behind the same upon the abnormal travel of said wheel.

In witness that I claim the foregoing I have hereunto subscribed my name this 3rd day of February, 1909.

RICHARD W. KELLY.

Witnesses:
G. E. HARPHAM,
S. B. AUSTIN.